May 21, 1957
L. A. ELLISON
2,792,718
POWER MOWER CONTROL MECHANISM
Filed Dec. 28, 1953
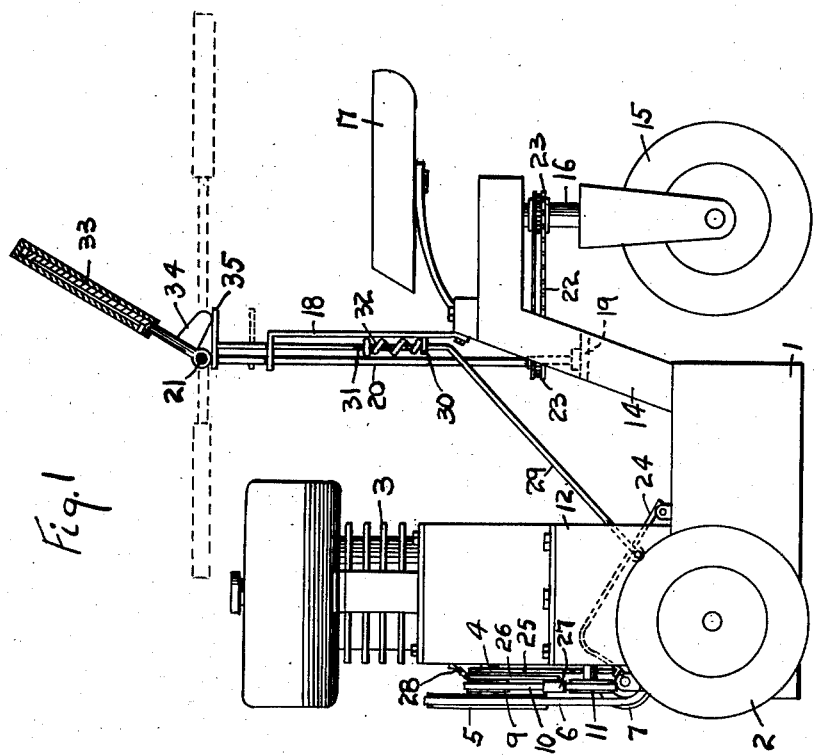
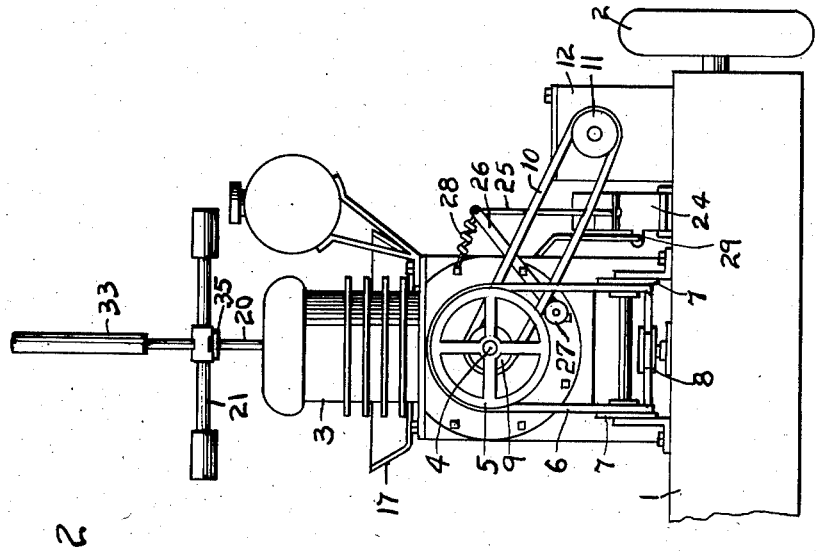
INVENTOR.
L. A. Ellison,
BY Kenneth M. Thorpe
Atty.

United States Patent Office 2,792,718
Patented May 21, 1957

2,792,718

POWER MOWER CONTROL MECHANISM

Luther A. Ellison, Topeka, Kans.

Application December 28, 1953, Serial No. 400,722

5 Claims. (Cl. 74—486)

This invention relates to self-propelled or power operated mowers of close-coupled type so that it can be used in confined spaces and is capable of very short turning radius. Mowers of this general type are frequently used on hill sides and over relatively rough terrain where there is danger of upset or the power is insufficient to pull the grade with the operator in riding position. Where conditions of this kind are encountered the operator is at a disadvantage if he descends from the machine and he sometimes loses control with damage to the machine and the injury of the operator.

The prime object of the present invention therefore is to provide means whereby the operator has full control of the forward movement of the machine and steering control thereof when he is dismounted and is walking behind or at the side of the machine. By this means the operator can dismount when there is danger of stalling on a grade or for any other reason, or when the terrain is rough or a bad incline is encountered where there may be danger of an upset.

A further object of the invention is to provide mechanism of the general type described which is of simple and inexpensive construction; and in order that it may be fully understood, reference is to be had to the accompanying drawing, in which:

Figure 1 is a side elevation of one type of machine embodying the invention.

Figure 2 is a fragmentary front elevation of the same.

Referring now to the drawing in detail, where like reference characters identify corresponding parts in all of the figures, 1 is a platform housing for the cutter mechanism which may be of reel or rotary form, and the platform is carried by driven ground wheels 2. Mounted upon the platform is an internal combustion engine or power source 3 having a drive shaft 4 carrying a drive wheel or pulley 5, which is encircled by a belt 6 passing over sheaves 7 to a pulley or the like 8 for driving the cutter blades, not shown.

Mounted on the drive shaft 4 between the pulley 5 and the engine 3, is a drive pulley 9 which is encircled by a belt 10 which also engages a pulley 11 of a power transmission 12 from which power is transmitted to drive the ground engaging wheels 2. The rear end of the platform 1 has an extension frame 14 which is carried by a steerable ground wheel 15 by means of a manually rotatable shaft 16.

Mounted on the frame 14 is an operator's set 17. Extending upwardly from the frame 14 and preferably on the center line of the seat between the driver's legs when on the seat is a rigid support bracket 18. Journaled in the bracket 18 and in a bearing 19 carried by frame 14 is a tiller rod 20 which is provided at its upper end with a cross handle 21 in convenient position for the operator when riding on seat 17. Steering movements of the handle 21 are transmitted to the caster wheel 15 through a chain 22 or the like encircling gears 24 on rod 20 and shaft 16 respectively.

In the particular construction illustrated, the engine 3 is constantly driven to operate the cutters, and forward or rearward movement is controlled through operation of foot pedals. The reverse foot pedal is not shown as normally it is not needed in connection with the control of the machine when the operator is dismounted. To control forward movement a foot pedal 24 is pivoted to the upper side of the platform 1. The speed of forward movement depends upon the extent of depression of pedal 24 as belt 10 loosely encircles pulleys 9 and 11.

When the operator depresses pedal 24 its movement is transmitted to a rod 25 which is connected at its opposite ends to the pedal and to a rock lever 26 which is pivoted at a midpoint to the engine frame. The other end of the rock lever 26 carries an idler pulley 27 which is rocked up against the outer face of belt 10 and imparts more or less tension on the belt to cause it to tightly or loosely engage the pulleys 9 and 11. When the operator releases the pressure on the pedal the idler backs away and the pedal returns to normal position under the impetus of a return spring 28.

In order for the driver to maintain steering and speed control of the machine when he is dismounted, the following mechanism is provided: Pivotally secured to the pedal 24 is one end of a control rod 29 which reciprocates through the upper end of the guide bracket 18 and through an auxiliary lower arm 30 of said guide bracket. Confined between the arm 30 and a pin 31 in rod 29 is a spring 32 which exerts pressure assisting the spring 28 in returning the pedal and rod to their upper or normal, machine-stopped, position.

Pivoted to the horizontal tiller handle 21 is an auxiliary extensible tiller bar 33 which can be swung to and from the forward and dotted line positions illustrated in Figure 1. The forward dotted line position is that used when the driver is occupying the driver's seat, and the rear position is that used when the driver is walking behind or beside the machine. The tiller bar 33 is provided with a cam 34 for pressing against a pressure pad 35 secured to the upper end of the reciprocatory control rod 29. With this construction it is clear that the operator can steer the machine and control the speed of forward movement through horizontal swinging and up and down movements, respectively, imparted to the tiller bar 33.

From the above description it will be apparent that I have produced a construction embodying all of the features of advantage set forth as desirable, and while I have described and illustrated the preferred embodiment, it is to be understood that I reserve the right to all changes within the spirit and scope of the appended claims.

I claim:

1. In a riding lawn mower vehicle having self-propelled power means, independent controls for clutch and steering for use by the operator when mounted on the vehicle, said clutch being held engaged by manual pressure and automatically disengaged upon relaxation of pressure, said steering control comprising a rotatable post, a rod paralleling the post and slidable in relation thereto and connected for clutch operation when slid longitudinally in one direction, an auxiliary steering bar for imparting rotation to the steering post, and a cam on said auxiliary bar for imparting sliding movement to the rod to effect clutch engagement.

2. In a riding lawn mower vehicle having self-propelled power means, independent controls for clutch and steering for use by the operator when mounted on the vehicle, said clutch being held engaged by manual pressure and automatically disengaged upon relaxation of pressure, said steering control comprising a rotatable post, a rod paralleling the post and slidable in relation thereto and connected for clutch engagement when slid longitudinally in one direction, an auxiliary steering bar journaled to the post to swing from operative to non-operative position, and a cam on said bar when in operative position for imparting sliding movement to the rod to effect clutch engagement.

3. In a riding lawn mower vehicle having self-propelled power means, independent controls for clutch and steering operations by the operator when mounted on the vehicle, said clutch control requiring constant application of manual force to hold the clutch engaged for driving the vehicle, said steering control comprising a rotatable post having a cross head steering bar, a rod paralleling the post and slidable in relation thereto and connected for clutch engaging operation, a pressure pad mounted at the upper end of said rod, an auxiliary steering bar pivoted to rotate on said cross head, and a cam on said auxiliary bar for applying pressure on the rod pad to effect engagement of the clutch.

4. In a riding lawn mower vehicle having self-propelled power means, independent controls for clutch and steering operations by the operator when mounted on the vehicle, said clutch control requiring constant application of manual force to hold the clutch engaged for driving the vehicle, said steering control comprising a rotatable post having a cross head steering bar, a rod paralleling the post and slidable in relation thereto and connected for clutch engaging operation, a pressure pad mounted at the upper end of said rod, an auxiliary steering bar pivoted to rotate on said cross head, a telescopic extension on said auxiliary bar, and a cam on the auxiliary bar for applying pressure on the rod pad to effect engagement of the clutch.

5. In a riding lawn mower vehicle having self-propelled power means, independent controls for clutch and steering operations by the operator when mounted on the vehicle, said clutch control requiring constant application of manual force to hold the clutch engaged for driving the vehicle, said steering control comprising a rotatable post having a cross head steering bar, a rod paralleling the post and slidable in relation thereto and connected for clutch engaging operation, a pressure pad mounted at the upper end of said rod, an auxiliary steering bar pivoted to rotate on said cross head from operative to inoperative position, and a cam on said auxiliary bar for applying pressure on the rod pad to effect engagement of the clutch when the auxiliary bar is in operative position, said cam being moved out of pad contact when the bar is in inoperative position.

References Cited in the file of this patent

UNITED STATES PATENTS

| | | |
|---|---|---|
| 376,638 | Daimler | Jan. 17, 1888 |
| 572,051 | Duryea | Nov. 24, 1896 |
| 602,621 | Grant | Apr. 19, 1898 |
| 781,989 | Ball | Feb. 7, 1905 |
| 1,072,438 | Durant | Sept. 9, 1913 |
| 1,239,236 | Voight | Sept. 4, 1917 |
| 1,247,425 | Lewis | Nov. 20, 1917 |
| 2,563,339 | Kellogg | Aug. 7, 1951 |
| 2,590,820 | Jedlika | Mar. 25, 1952 |

FOREIGN PATENTS

| | | |
|---|---|---|
| 248,559 | Great Britain | Mar. 11, 1926 |
| 513,292 | France | Oct. 29, 1920 |